June 14, 1960     O. GREBE     2,941,123

CONTROL SYSTEM

Filed June 23, 1958     3 Sheets-Sheet 1

Inventor:
OTTO GREBE
BY Toulmin & Toulmin
ATTORNEYS

June 14, 1960

O. GREBE 2,941,123

CONTROL SYSTEM

Filed June 23, 1958

Inventor:
OTTO GREBE
BY Toulmin & Toulmin
ATTORNEYS

June 14, 1960  O. GREBE  2,941,123
CONTROL SYSTEM
Filed June 23, 1958  3 Sheets-Sheet 3

Inventor:
OTTO GREBE
By Toulmin & Toulmin
Attorneys

United States Patent Office 2,941,123
Patented June 14, 1960

2,941,123
CONTROL SYSTEM

Otto Grebe, Berlin-Lichterfelde, Germany, assignor to Licentia Patent-Verwaltungs-G.m.b.H., Hamburg, Germany Filed June 23, 1958, Ser. No. 743,932
11 Claims. (Cl. 317—100)

The present invention relates to a control system for controlling electrical apparatus. More in particular, the present invention relates to a control system comprising contactor means and resistances with separate ventilation means.

It is known in the art to provide a control system comprising contactor means wherein the contacts are actuated by hydraulic means comprising hydraulic cylinders and small electromagnets controlling the inlet and the outlet of the pressure medium. An electric apparatus can be controlled by these hydraulically operating contactor means which connect a plurality of various resistances with the electrical apparatus to be controlled. Because of the great power loss these resistances have to be cooled effectively. If the cooling means fail to operate the resistances will be overheated and burned very quickly, especially in view of the fact that these resistances are very small and therefore have only a very small heat capacity.

It is an object of the present invention to provide a control system comprising contactor means and resistances with separate ventilation means which is very safe in operating and wherein the resistances are effectively protected against overheating and burning.

It is another object of the present invention to provide a control system comprising contactor means and resistances with separate ventilation means wherein the resistances are much more effectively cooled than in known constructions.

It is a further object of the present in vention to provide a control system comprising contactor means and resistances with separate ventilation means which requires less space than known constructions and wherein the service life of the contacts of the contactor means is greatly increased.

It is yet another object of the present invention to provide a control system comprising contactor means and resistances with separate ventilation means wherein small D.C. currents can be effectively eliminated at the contacts of the contactor means.

These objects, as well as further objects and advantages which will become apparent as the description thereof proceeds are achieved by the control system of the present invention comprising contactor means, hydraulic means actuating the contact means, a plurality of resistances capable of carrying a great load, ventilator means for cooling the resistances and an oil pump for producing the hydraulic pressure actuating the contactor means, and a single motor driving both the ventilator and the oil pump. According to a further feature of the invention the resistances consist of corrugated resistance strips assembled to form a flat honey-comb shaped resistance package allowing the cooling air to pass through the hollow spaces in the package transversely with respect to the large surface of the resistance package, with the width of the resistance package being small in the direction of the air stream.

The invention will be more fully appreciated upon the following description of the accompanying drawings, wherein Figure 1 is a longitudinally sectional view of the control device of the present invention;

Figure 1:
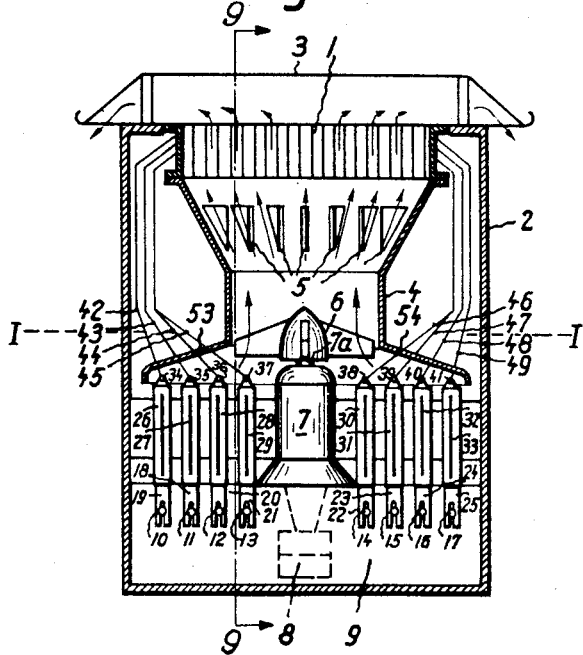

The resistance 1, for example the rotor resistance of a three-phase current motor having a flat configuration and a honey-comb shaped structure is mounted in the upper part of the casing 2 with one of its flat sides facing the protective cover 3. The lower portion of the flat resistance 1 is covered by the diffusor 4. If required, the diffusor 4 can be equipped with cooling baffles 5 uniformly distributing the cooling air. At its upper end the shape of the diffusor 4 is adapted to the configuration of resistance 1 and is thus rectangular or square-shaped whereas its lower end is circular and houses the ventilator 6, having a plurality of ventilator blades. The pressure medium, for example the pressure oil is conveyed by an oil pump, for example a geared pump in the closed tank 9 forming an integral structure with the casing 2 and forming the lower portion of the latter. The casing 2 also houses the motor 7 which may be, for example, a small short-circuited rotor motor. According to the invention this centrally disposed motor drives both the ventilator 6 and the oil pump 8.

Figure 2:
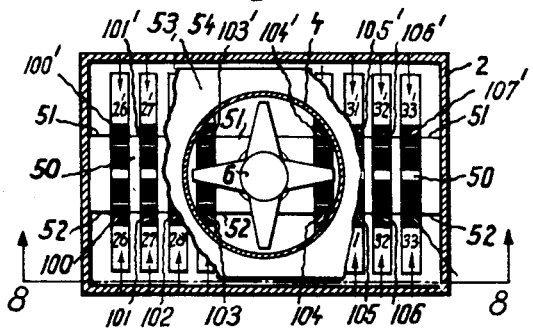
Figure 2 is a cross sectional view of the control device of the present invention taken along lines I—I in Figure 1.

There are further provided a plurality of plungers 10 through 17 which project laterally from the front side of the tank 9. An equal number of plungers can be provided at the rear side of the tank 9. These plungers actuate single or multi-pole high current contacts 100 through 107 via the vertically disposed slotted contact levers 18 through 25. The high-current contacts are schematically shown in Figure 2 of the drawings by the small black blocks 100 through 107. Each of these contacts has an associated spark arrester 26 through 33. Opposite to the plungers 10 to 17 adjoining the spark arresters 26 through 33 there are provided the connecting screws 34 through 41 which are connected with the high-current leads 42 through 49 connecting the plungers with the resistance 1.

The spark arresters 26' through 33' shown in Figure 2 are associated with the rearwardly disposed high-current contacts 100' through 107' which, in turn, are actuated by the plungers provided at the rear side of the tank 9 (not shown). The high-current contacts and the corresponding spark arresters are arranged at either side of a vertically disposed insulating plate 50.

By means of the slotted contact levers some of which are shown and are indicated by the reference numbers 18 through 25, the individual high-current contacts can be replaced after having removed the spark arresters and having disconnected the high-current leads. This can be done without disturbing in any way the tank 9 and the plungers projecting therefrom. On the other hand, the entire tank 9 with all the contact driving means provided therein and including the motor 7 can be removed in downward direction after having disconnected the ventilator 6 from the shaft 7a of the motor 7 without changing anything at the high-current side of the device with its comparatively thick leads.

The pump 8 driven by the motor 7 produces an oil pressure equivalent to an atmospheric excess pressure in the order of twenty. A small electromagnet having a power output of 1 to 5 watt actuates a small oil sluice valve against a spring thereby conducting the pressure oil into a small horizontally disposed oil piston. This oil piston has a power output of, for example, 20 kilograms and presses against one plunger which, in turn, is pressed against the piston by a biasing means such as a spring with a force of about 10 kilograms. The resulting force of 10 kilograms moves the associated contact lever in the contact-making direction thereby closing the high-current contact. As soon as the corresponding electromagnets are supplied with voltage all plungers are pressed in an outward direction by the electro-hydraulic means. The various electromagnets can be excited in a predetermined sequence by a small control drum provided with a plurality of contacts mounted thereon at predetermined locations.

It is, of course, also possible to have only one of the various plungers actuated in the afore-described manner and to provide oil pressure conduits which are opened by the movement of the plunger so that the oil pressure is allowed to actuate the other plungers according to a predetermined sequence.

As soon as the excitement of the small control electromagnets is interrupted the plunger spring will disconnect the high-current contact. The contact levers may be fork-shaped and engage a recess in the plungers. Independent switching operations can be initiated in the afore-described manner by a control drum or by small auxiliary contacts provided at the plunger in the tank 9. As only the small electromagnets with 1 to 5 watt have to be switched it is not necessary to provide large actuating coils; very small contacts are sufficient and transistor connections and other electronic means can be used with advantage.

Since every high-current contact is actuated by the oil pressure all closed contacts are immediately disconnected as soon as the motor 7 is out of operation as in the latter case the oil pressure of pump 8 will be immediately released. In this way, stoppage of the single motor 8 will produce not only stoppage of the ventilator 6, but also stoppage of the pump 7 which, in turn, allows opening of the contacts under the influence of the biasing means. Consequently, when the ventilator 6 is stopped, no current can flow through the resistance 1, and no harm can therefore be done to this resistance, particularly in view of the fact that there is a safety margin of 30 seconds during which period the resistance can safely remain in operation without ventilation cooling.

The afore-described control system can be used for D.C. motors and three-phase-current motors as well as for the exciting circuit of large generators for example in combination with a Leonard-control and the like. The single contacts are of the same size as indicated schematically in Figures 1 and 2 where the high current contacts and the spark arresters all have the same size. At least the insulating side portions and levers, the connecting screws, mounting elements etc. should be of the same size so that the size of the various high current contacts differs only with respect to their axial widths according to the current intensity or the number of poles.

The electro-hydraulically operated control system of the present invention requires considerably less space than the known constructions and for that reason the high current contacts can be made very strong which, of course, increases their service life considerably.

For the high current contacts any of the conventional contact arrangements can be used, as, for example, bipolar contact bridges with comparatively weak blow-out means and a deionization chamber, as well as a single pole contact with stronger blow-out means and a simple spark arrester. The control system of the invention offers a considerable progress in this connection as undesired weak D.C. currents can be effectively eliminated by causing the vigorous stream of air produced by the ventilator 6 to pass the high-current contacts. In Figure 2 the arrows show the direction of the stream of air entering the casing 2 uniformly distributed through the slots of the spark arresters and passing the high current contacts. The separating walls 51 and 52 extending between the contacts force the cooling air to enter only through the slots of the spark arresters. Due to the sheets 53 and 54 the air is removed from the interior between the contacts thereby producing a vigorous stream of air at the high-current contacts. The air passing the contacts simultaneously cools and cleans the same.

Figure 3:
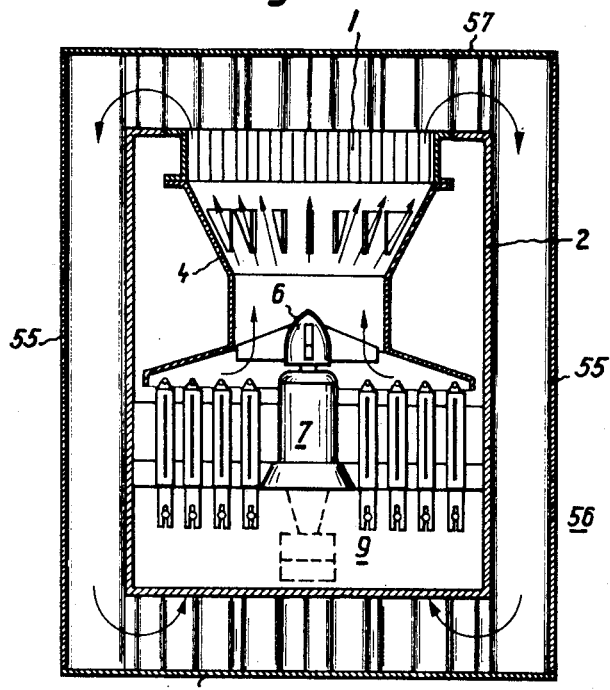
Figure 3 is a longitudinally sectional view of another embodiment of the control device of the present invention.
Figure 3A:
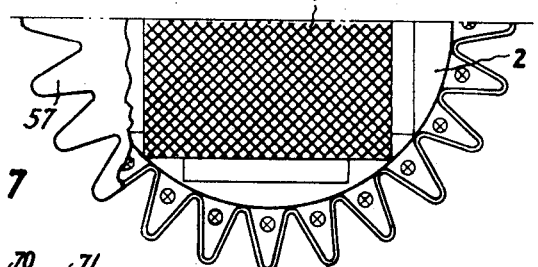
Figure 3a is a cross sectional view of a part of the control device of the invention illustrating the configuration of the walls of its housing.

In the arrangement just described the cooling is effected by fresh air supplied from the outside which is necessary where a constant load is applied to the resistance 1 without interruption. For many purposes, however, the control program calls for short periods of connection of the resistance only resulting in a heating of brief duration. In that case the medium power loss is comparatively small and it is therefore sufficient to revolve the air within the entirely closed exterior tank 56 by means of the ventilater 6 (see Figure 3). The heat exchange can be greatly improved by giving the cooling surfaces 55 of the tank 56 a configuration as shown for example in Figure 3 wherein the tank 56 has corrugated walls. The air is revolved as indicated by the arrows in Figure 3 and travels around the housing 2, with the sheet 57 forcing the stream of air to pass the wall 55. This arrangement will be of particular advantage where the outside of the tank 56 is dirty and filled with dust, harmful gases and the like. The cooling effect can be further increased by also giving the exterior walls of the tank a corrugated configuration and cooling the same by exterior ventilating means.

Figure 4:
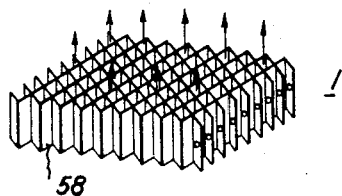
Figure 4 is a somewhat schematic, perspective view of a resistance package of the present invention capable of carrying a very high load and used in the control device of the present invention.

The construction of the resistance 1 is shown in Figure 4 in which single resistance strips 58 are bent in a zig-zag manner and are so assembled that the edges contact each other thereby obtaining a honey-comb shaped resistance package forming square or meander-shaped hollow spaces. The cooling air passes through these hollow spaces in the direction indicated by the arrows in Figure 4.

If the individual resistances have the identical ohmic value and are connected in parallel the strips 58 can be attached to each other by spot welding. If the resistance strips 58 are not connected in parallel but are to be connected in series the edges which otherwise would be in mutual contact are separated from one another by heat resistant insulating strips.

Figure 5:
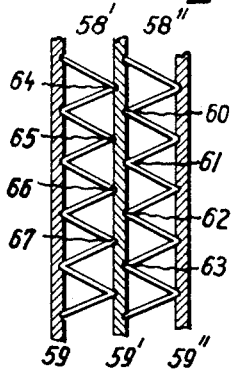
Figure 5 is a plan view of resistance strips with interposed insulating strips for the resistance used in the control device of the present invention.
Figure 6:
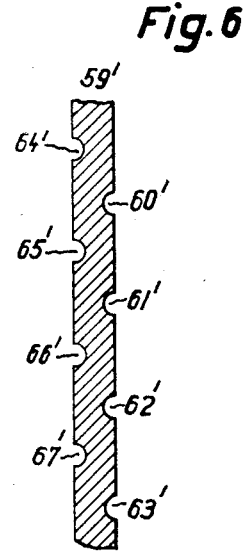
Figure 6 shows a single insulating strip shown in combination with the resistance strips in Figure 5.

If the resistance strips do not have the same ohmic value it will be of advantage to insert thin insulating strips 59' and 59'' between the resistance strip 58' and 58'' (see Figures 5 and 6). In this case the hindrance to the air stream passing through the resistance package will be only very slightly greater than in the ideal case of the honey-comb shaped structure shown in Figure 4. The edges 52, 53 of the resistance strip 58'' are inserted into the small grooves 60' through 63' of the heat resistant insulating strip 69'', whereas the edges 64 through 67 are inserted into the grooves 64' through 67'. Experiments have shown that a resistance shaped as described herebefore and whose dimensions are 250 x 260 x 65 millimeters is able to take care of a power loss of 40 kilowatt with a ventilator output of 600 watt. A resistance of the invention will thus be able to release more than 500 kilowatt for each square-meter of its surface.

Figure 7:
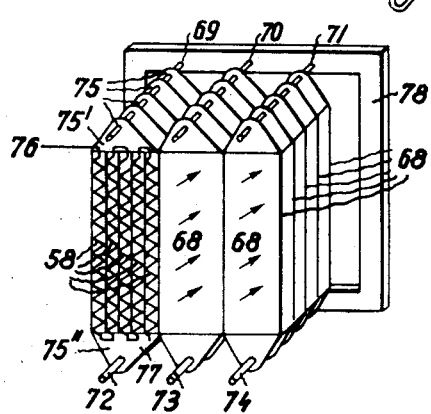
Figure 7 is a somewhat schematic, perspective view of another embodiment of the resistance capable of carrying a very high load and used in the control device of the present invention, comprising the elements shown in Figures 5 and 6.
Figure 8:
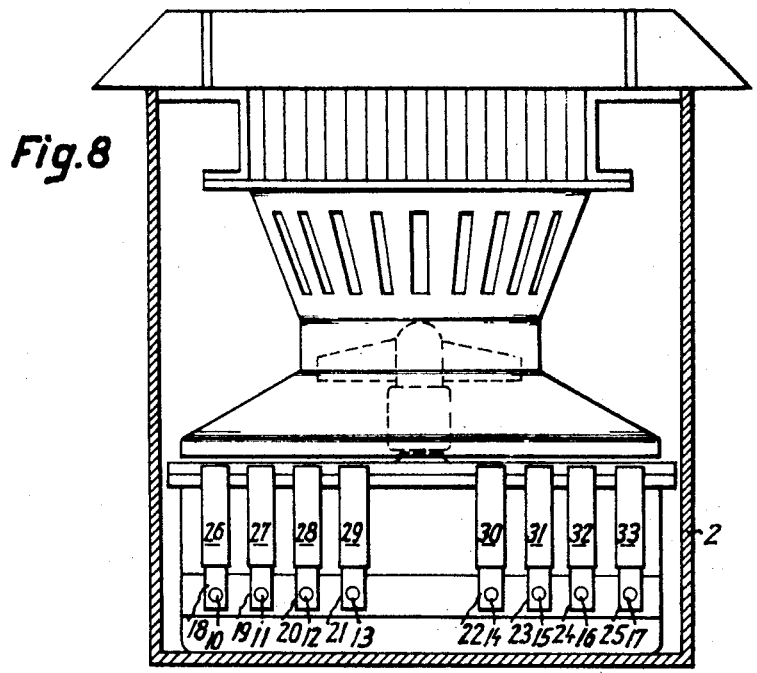
Figure 8 is a sectional view taken along the line 8—8 of Figure 2.
Figure 9:
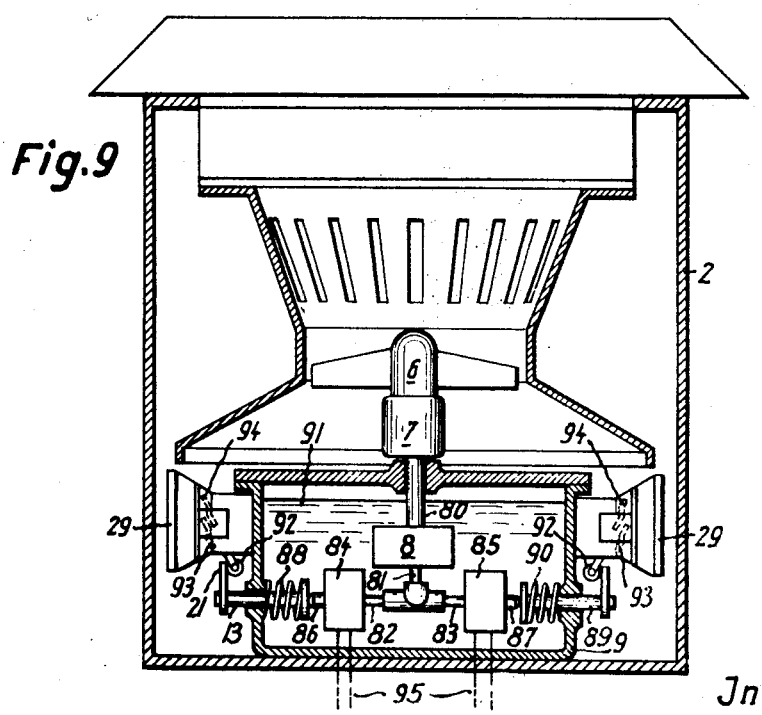
Figure 9 is a sectional view taken along the line 9—9 of Figure 1 and shows the relationship of the hydraulic power elements in connection with the resistance.

The resistance packages composed of the single resistance strips 58 can be assembled to form a resistance unit 68 as shown in Figure 7 by connecting several of such resistance units by insulating bolts 69 through 74. Thereby a larger resistance unit of any desired size is obtained. The bolts 69 through 74 support triangular heat-resistant insulating members 75 with intermediate spacing pieces. These members 75 bear the ends of the resistance elements 68 and the resistance strips 58.

By way of an example, the lead 76 is connected to the insulating member 75' and hence to the first, left resistance strip. In the insulating member 75" the first resistance strip is connected in series with the second resistance strip, in the member 75' the second resistance strip 1 connected with the third and so forth up to the lead 77. The bolts 69 through 74 are connected with one another by frame 78.

The oil pump 8 is driven by the shaft 80 which extends from the motor 7. Oil pressure lines 81, 82 and 83 lead from the oil pump 8 to the electro-hydraulic power elements 84 and 85, which have longitudinally moving pistons 86 and 87, respectively. The emission of oil under pressure against the pistons 86 or 87, respectively, can be controlled by electro-magnetically actuated valves. The piston 86 is urged by oil pressure against one of the adjacent push rods 10—17, such as may be seen in Figures 1 and 3 of the drawings. Each of the push rods 10—17 are in turn pivotally connected with one of the contact levers 18—25 with which the contacts are directly connected.

Each of the push rods 10—17 has a spring 88 thereon which moves its respective push rod with the piston 86 to the right upon the release of oil pressure. As a result the high voltage contact and the contact lever is open. There are arranged in series eight electro-hydraulic power elements 84 which are vertical to the plane of the drawings.

There is an additional push rod on the other side of the oil container 9. It is possible that several push rods 89 can be arranged side by side to actuate corresponding high voltage contacts. A spring 90 is mounted on each push rod 89 and acts in the same manner as the previously described spring 88. The oil container 9 is filled with oil to the level indicated at 91.

With respect to the contact structure, this comprises a pivotally mounted contact arm 92 having a high voltage contact 93 carried by the contact arm. There is a fixed high voltage contact 94 which is engageable by the contact arm. The control current line leading from the electro-hydraulic power elements 84 and 85 are indicated at 95.

The particular construction of the resistance renders the same capable of carrying a very high load. The cooling of the resistances is much more effective. Since the motor drives both the oil pump and the ventilator the oil pressure is immediately released whenever the ventilator does not work and cannot cool the resistances, and the contacts of the contactor means are opened by the associated spring. If brakes are provided these come into operation as, for example, in a three-phase-current motor the magnet retaining the brakes in their inoperative position becomes currentless. The control system of the present invention therefore operates very efficiently and safely.

It will be understood that this invention is susceptible to modification in order to adapt it to different usages and conditions, and, accordingly, it is desired to comprehend such modifications within this invention as may fall within the scope of the appended claims.

What I claim is:

1. Control system for controlling electrical apparatus comprising contactor means, a plurality of resistances in circuit with said contactor means, separate ventilating means for cooling said resistances, electro-hydraulic means for actuating said contactor means, said electro-hydraulic means incorporating an oil pump for supplying the pressure necessary to maintain said contactor means in close position, and a single motor driving both said oil pump and said ventilating means, whereby stoppage of said single motor will produce not only stoppage of said ventilating means but also stoppage of said oil pump, which, in turn, causes opening of said contactor means so that when said ventilating means are stopped, no current can flow through said resistances.

2. In a control system as described in claim 1, a resistance comprising a plurality of corrugated resistance strips forming a flat, honey-comb shaped resistance package, the cooling air advanced by said ventilating means passing through the spaces defined by the honey-comb structure of said resistance, with the width of said resistance being small in the direction of the stream of cooling air passing therethrough.

3. In a control system as described in claim 1, a resistance comprising a plurality of corrugated resistance strips connected in parallel and being assembled with their respective edges of the corrugations contacting one another and being attached by spot welding, thus forming a flat, honey-comb shaped resistance package, the cooling air advanced by said ventilating means passing through the spaces defined by the honey-comb structure of said resistance, with the width of said resistance being small in the direction of the stream of cooling air passing therethrough.

4. In a control system as described in claim 1, a resistance comprising a plurality of corrugated resistance strips and a plurality of heat resistant insulating strips, said resistance strips and said heat resistant insulating strips being assembled with said insulating strips separating said resistance strips from one another and forming a flat, honey-comb shaped resistance package, the cooling air advanced by said ventilating means passing through the spaces defined by the hone-comb structure of said resistance, with the width of said resistance being small in the direction of the stream of cooling air passing therethrough.

5. A resistance in a control system as described in claim 4, further comprising a plurality of bolts, each one of said bolts supporting a predetermined number of said resistance strips and said heat resistant insulating strips arranged one behind the other so as to form a unit, all of said units being assembled one adjacent to the other thus forming the resistance package.

6. Control system for controlling electrical apparatus comprising contactor means, a plurality of resistances in circuit with said contactor means, separate ventilating means for cooling said resistances, a diffusor housing said ventilating means and causing cooling air to be conveyed to every single portion of said resistances, electro-hydraulic means for actuating said contactor means, said electro-hydraulic means incorporating an oil pump for supplying the pressure necessary to maintain said contactor means in closed position, and a single motor driving both said oil pump and said ventilating means, whereby stoppage of said single motor will produce not only stoppage of said ventilating means but also stoppage of said oil pump, which, in turn, causes opening of said contactor means so that when said ventilating means are stopped, no current can flow through said resistances.

7. Control system for controlling electrical apparatus comprising contactor means having a plurality of high-current contacts, a plurality of resistances in circuit with said contacts, separate ventilating means for cooling said resistances, means for passing the cooling air of said ventilating means between said high-current contacts, electro-hydraulic means for actuating said contactor means, said electro-hydraulic means incorporating an oil pump for supplying the pressure necessary to maintain said contacts in closed position, and a single motor driving both said oil pump and said ventilating means, whereby stoppage of said single motor will produce not only stoppage of said ventilating means, but also stoppage of said oil pump, which, in turn, causes opening of said contacts so that when said ventilating means are stopped, no current can flow through said resistances.

8. Control system for controlling electrical apparatus comprising a closed casing, and, disposed in such casing, contactor means, a plurality of resistances in circuit with said contactor means, separate ventilating means for cooling said resistances, electro-hydraulic means for actuating said contactor means, said electro-hydraulic means incorporating an oil pump for supplying the pressure necessary to maintain said contactor means in closed position, and a single motor driving both said oil pump and said ventilating means the stream of air of said ventilating means being revolved in the interior of said casing, whereby stoppage of said single motor will produce not only stoppage of said ventilating means but also stoppage of said oil pump, which, in turn, causes opening of said contactor means so that when said ventilating means are stopped, no current can flow through said resistances.

9. Control system for controlling electrical apparatus comprising a closed casing having an exterior wall portion of a corrugated shape, and, disposed in said casing contactor means, a plurality of resistances in circuit with said contactor means, separate ventilating means for cooling said resistances, electro-hydraulic means for actuating said contactor means, said electro-hydraulic means incorporating an oil pump for supplying the pressure necessary to maintain said contactor means in closed position, and a single motor driving both said oil pump and said ventilating means, the stream of air of said ventilating means being revolved within said casing, and exterior ventilating means cooling said tank from the outside, whereby stoppage of said single motor will produce not only stoppage of said ventilating means, but also stoppage of said oil pump, which, in turn, causes opening of said contacts so that when said ventilating means are stopped, no current can flow through said resistances.

10. A control system for controlling electrical apparatus, comprising, in combination: contactor means; resistor means in circuit with said contactor means; ventilating means for cooling said resistor means; hydraulic means for actuating said contactor means, said hydraulic means incorporating pump means for supplying the pressure necessary to maintain said contactor means in closed position; and a single motor driving both said ventilating means and said pump means, whereby stoppage of said single motor will produce not only stoppage of said ventilating means but also stoppage of said pump means, which in turn causes opening of said contactor means so that when said ventilating means are stopped, no current can flow through said resistor means.

11. A control system for controlling electrical apparatus, comprising, in combination: contactor means; biasing means for continuously urging said contactor means to open position; resistor means in circuit with said contactor means; ventilating means for cooling said resistor means; hydraulic means for actuating said contactor means, said hydraulic means incorporating pump means for supplying the pressure necessary to maintain said contactor means in closed position against the action of said biasing means; and a single motor driving both said ventilating means and said pump means, whereby stoppage of said single motor will produce not only stoppage of said ventilating means but also stoppage of said pump means, which in turn allows opening of said contactor means under the influence of said biasing means so that when said ventilating means are stopped, no current can flow through said resistor means.

References Cited in the file of this patent

UNITED STATES PATENTS

| 2,171,643 | Brenkert | Sept. 5, 1939 |
| 2,317,254 | Cowin | Apr. 20, 1943 |
| 2,394,086 | Ludwig | Feb. 5, 1946 |
| 2,790,122 | Powers | Apr. 23, 1957 |

FOREIGN PATENTS

| 538,908 | Germany | Sept. 17, 1930 |